United States Patent
Martin

(10) Patent No.: US 7,814,783 B2
(45) Date of Patent: Oct. 19, 2010

(54) SODAR SOUNDING OF THE LOWER ATMOSPHERE

(75) Inventor: Andrew Louis Martin, Ferny Creek (AU)

(73) Assignee: Windbidco Pty Ltd, Victoria (AU)

( * ) Notice: Subject to any disclaimer, the term of this patent is extended or adjusted under 35 U.S.C. 154(b) by 331 days.

(21) Appl. No.: 11/993,207

(22) PCT Filed: Jun. 15, 2006

(86) PCT No.: PCT/AU2006/000818

§ 371 (c)(1),
(2), (4) Date: May 29, 2008

(87) PCT Pub. No.: WO2006/135955

PCT Pub. Date: Dec. 28, 2006

(65) Prior Publication Data

US 2010/0046325 A1 Feb. 25, 2010

(30) Foreign Application Priority Data

Jun. 20, 2005 (AU) .............. 2005903236
Jun. 23, 2005 (AU) .............. 2005903353

(51) Int. Cl.
*G01K 1/00* (2006.01)
(52) U.S. Cl. ................................. 73/170.13
(58) Field of Classification Search ........ None
See application file for complete search history.

(56) References Cited

U.S. PATENT DOCUMENTS

| | | | | |
|---|---|---|---|---|
| 5,142,504 A | * | 8/1992 | Koster et al. | 379/88.16 |
| 5,544,525 A | * | 8/1996 | Peterman et al. | 73/170.13 |
| 5,661,460 A | | 8/1997 | Sallen et al. | |
| 6,856,273 B1 | * | 2/2005 | Bognar | 342/26 D |
| 6,987,707 B2 | * | 1/2006 | Feintuch et al. | 367/99 |
| 7,106,656 B2 | * | 9/2006 | Lerro et al. | 367/99 |
| 7,178,408 B2 | * | 2/2007 | Martin | 73/861.25 |
| 2004/0252586 A1 | * | 12/2004 | Martin | 367/89 |
| 2005/0232082 A1 | * | 10/2005 | Martin | 367/129 |
| 2006/0162440 A1 | * | 7/2006 | Martin | 73/170.13 |
| 2008/0285387 A1 | * | 11/2008 | Martin | 367/87 |

OTHER PUBLICATIONS

Scintec, "Acoustic Wind Profilers—Advanced High Performance Sodars for Wind and Turbulence", Dated Oct. 28, 2004, Accessed online: Aug. 9, 2006 from <URL: http://web.archive.org/web/20041028124412/http://www.scintec .com/Site.1/PDFs/Product_Information_FAS_5.pdf> Whole Document.

(Continued)

*Primary Examiner*—Andre J Allen
(74) *Attorney, Agent, or Firm*—Hovey Williams LLP

(57) ABSTRACT

A monstatic sodar system using long chirps and send-while-listening techniques employs transmitter-receiver pairs ($T_w$, $R_w$; $T_v$, $R_v$; $T_e$, $R_e$) that have coincident main lobes ($T_{wm}$, $R_{wm}$; $T_{vm}$, $R_{vm}$; $T_{em}$, $R_{em}$). The system uses digital time domain matched filters and frequency modulated or digitally modulated (eg, BPSK) chirps. Digital frequency domain matched filtering may also be used. The matched filters generate sample streams indicative of the phase and amplitude of echo signals returned from the atmosphere after the transmission of a chirp into the atmosphere.

19 Claims, 7 Drawing Sheets

OTHER PUBLICATIONS

UFAM, "Acoustic Sounders", Dated Sep. 3, 2004, Accessed online: Aug. 9, 2006 from <URL: http://web.archive. org/web/20040903104918/http://www.env.leeds.ac.uk/ufam/instruments/sodar.php> Whole Document.

Antoniou, I. et al., "On the theory of SODAR measurement techniques" Dated Apr. 2003, Accessed online: Aug. 9, 2006, from <URL: http//www.acoustics.salford.ac.uk/research/von_hunerbein_files/publications/ris-r-1410.pdf> Whole Document.

* cited by examiner

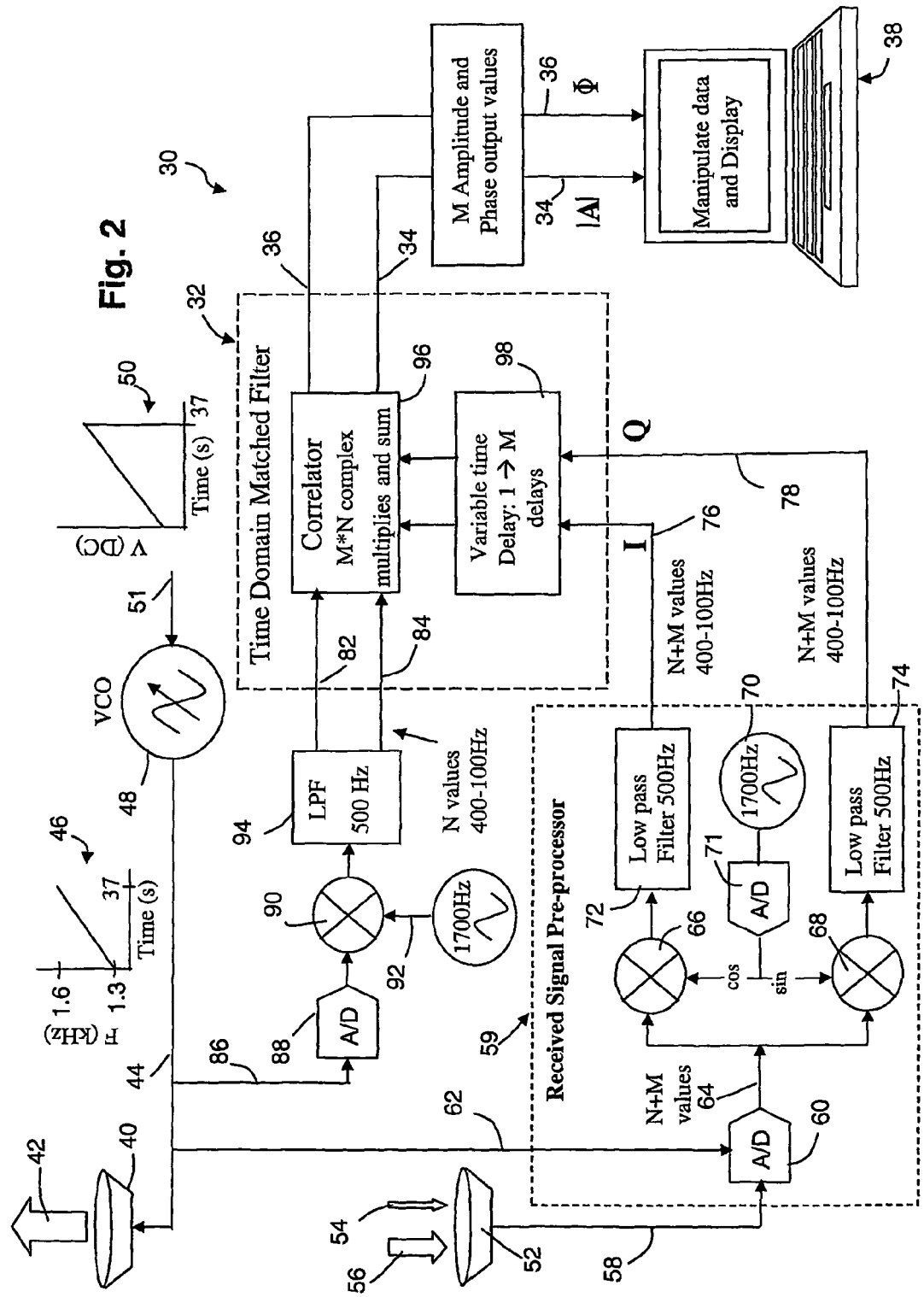

Frequency Domain Matched Filter Processing

Time Domain Matched Filter Processing

SODAR SOUNDING OF THE LOWER ATMOSPHERE

RELATED APPLICATIONS

This application claims priority from and the benefit of Australian provisional patent application Nos. 2005903236 and 2005903353 filed on 20 Jun. 2005 and 23 Jun. 2005, respectively the disclosures of which are incorporated herein by reference.

BACKGROUND TO THE INVENTION

1. Technical Field

This invention relates to sodar methods and apparatus for sounding in the lower atmosphere and is particularly applicable to 'monostatic' systems where backscattered echoes are detected by receiver(s) located near the transmitter. However, in some embodiments, this invention is also applicable to 'bistatic' systems where forward-scattered echoes are detected by receiver(s) located remotely from the transmitter (the distances being relative to the sounding range).

It is appreciated that a more narrow usage of the terms monostatic and bistatic can be found in the art in which 'monostatic' indicates systems in which the same aerial is used for transmission and reception (as is common in radar) and 'bistatic' being used for systems where the transmit and receive aerials are separate. This narrow usage is not helpful in sodar where 'listen-while-sending' techniques may be employed and is not used herein.

In this specification, the term 'chirp' is used as convenient shorthand for an interrogation or chirp used in sodar sounding that is acoustic and is encoded or modulated in a manner adapted to facilitate the extraction of the returned echo components of received acoustic signals.

2. Discussion of Prior Art

In our prior U.S. Pat. No. 6,755,080 and our prior international patent applications PCT/AU2002101129, PCT/AU2004/00175 and PCT/AU2004/00242 we addressed the central problem of low signal-to-noise (s/n) ratios in sodar by the use of (i) long chirps, (ii) 'listen-while-sending' techniques in which transmission overlaps reception and (iii) matched filtering to extract echo data from the received signals by making use of the encoding of the chirp. The discussion of the prior art in this patent and in these applications is incorporated herein.

In the context of the present invention, a 'long' interrogation—or transmit—pulse is taken to be one that has not terminated before the first echoes of interest are received; hence the need for the listen-while-sending technique. In absolute terms, chirps of between 100 ms and tens of seconds with bandwidths of 3-10 kHz are preferred. The great advantages of our listen-while-sending technique are (i) the very large processing gain made possible by the use of the long chirp, (ii) the elimination of the need for the high peak powers associated with short pulses and (iii) the removal of the range and power limitations of send-then-listen sodar. We found that listen-while-sending was entirely practical in bistatic sodar because the combination of low peak transmit power, high dynamic-range receiver microphones, good acoustic shielding of receivers from the direct signal and the high system processing gain allowed echoes to be readily detected 'behind' the direct signal. [The direct signal is that which is transmitted directly between transmitter and receiver without reflection from the atmosphere.]

Our prior patent applications disclosed other advantageous sodar techniques such as the selective combination of the outputs of multiple matched receivers to substantially eliminate undesired signal components and unique methods of processing extracted echo data to generate information of value to meteorologists and air-traffic controllers. Though our prior patent applications were not limited to the use of Fourier—or frequency domain—matched filter techniques, the practical examples provided illustrated such techniques because (i) the implementation of time-domain matched filter methods were computationally demanding and impractical for the prompt generation visual displays when using long chirps, and (ii), they were found to be inferior to the computationally efficient Fourier methods where Doppler echo components were of importance.

We have now been surprised to find that appropriate time-domain matched-filter processing of received signals can be implemented without excessive computing power in both bistatic and monostatic systems. We have also found that two other factors facilitate this, particularly in the more challenging monostatic systems: first, attention to the arrangement and alignment of transmitter-receiver pairs and, second, the use of narrow bandwidth chirps. These appear to significantly improve recovery of Doppler components from received signals when using time-domain matched filtering with either FM (frequency modulated) or DM (digitally modulated) chirps. Indeed, these factors also improve sodar systems using encoded chirps and Fourier domain matched filtering.

OUTLINE OF THE INVENTION

From one aspect, the invention employs time-domain, matched filtering of received sodar signals in listen-while-sending sodar. Preferably, the matched filtering employs complex techniques (ie, that utilizing real and quadrature values) to generate both amplitude and phase echo information, but non-complex processing may be employed where echo amplitude information alone is adequate. Where complex processing is employed, the complex conjugate of a time-sampled received signal can be cross-correlated with the complex conjugate of the transmit signal to attenuate signal noise and enhance the echo signal components to derive the echo phase and amplitude data that can be usefully processed to provide outputs of value to meteorologists, as taught in our prior patent applications. Either the time-sampled transmit or received signal may be convolved prior to correlation to enhance discrimination. Indeed, both convolved and non-convolved matched filters may be implemented and the results compared and selected. This may have advantage where the returned signal contains significant Doppler components.

We have found it desirable, though not essential, to subject the received signal to bandpass—or at least lowpass filtering—using Fourier techniques before or after the formation of the complex received-signal conjugate. Though such filtering before has the advantage of economy, we have found it preferable to separately filter the real and quadrature conjugate receiver data streams.

From another aspect, this invention involves the use of narrow-bandwidth chirps—preferably, though not essentially, of less than 500 Hz and time-domain correlation of the transmitted and received signals. There appears to be useful synergy in this combination. However, issues relating to chirp time-duration appear to be unchanged from those discussed in our prior patent applications. That is, there is an important tradeoff between pulse duration and sin on the one hand and computational load on the other (for a given system speed) seems largely unaffected.

The chirps—whether digitally modulated [DM] or frequency modulated [FM] preferably, but not essentially have a ratio of bandwidth to center frequency of less than 0.35, preferably less than 0.25 and most preferably less than 0.2. It is undesirable, we have found, to go much below 0.04. Thus, an optimal range of the ratio of chirp bandwidth to center frequency for many systems will lie between 0.04 and 0.20 and, probably, between 0.05 and 0.01. We call chirps in the ranges indicated 'narrow chirps'. As the chirp bandwidth is reduced below the ratio of 0.05, the resolution of the system starts to degrade rapidly so that for a ratio of bandwidth to chirp center frequency of 0.02 the resolution is substantially degraded. This forms a lower practical limit of chirp bandwidth.

The benefit of narrow chirps in combination with time-domain correlator-based matched-filtering is surprising because (i) it is counter-intuitive to expect better discrimination using an interrogation signal with much fewer cycles—ie, apparently less information—than bandwidths that were previously seen as efficient and (ii) the scientific literature does not suggest that the performance of sodar systems is largely independent of pulse bandwidth within wide ranges. We have investigated this surprising phenomenon for some time and now believe that it is related to inherent characteristics of the atmosphere that affect the phase coherence of returned echoes in a manner that appear to favour the type of matched filter processing just indicated. While some scientific basis for this speculation is offered below, the correctness of the explanation does not affect the validity of the discovery of the benefits offered by the use of narrow chirps in sodar, nor does it affect the claims or scope of the invention as outlined above.

While it is envisaged that simple linear FM transmit chirps—eg., those in which frequency rises or falls linearly with time—can be used, another aspect of the present invention involves non-linear modulation of an audio carrier signal to generate chirps that are suited to matched filter processing of the received signal. Of particular interest in the present context are restricted bandwidth non-linear chirps suited to pulse-compression and matched-filter processing in the time domain. For example, chirps of bandwidths of a few hundred Hz can be phase-shift keyed (modulated) in a manner to effect pulse-compression upon reception and to allow matched-filtering using time-domain correlation techniques at much lower sampling rates (data points) than envisaged as being practical in our aforementioned prior patent applications. This makes realtime processing of echo data entirely feasible using currently available personal computers (PCs). Such non-linearly modulated chirps include, in particular, DM chirps that exhibit pulse compression characteristics, the general principles of which are well known.

As also disclosed in our prior patents, multiple receivers can be located equidistant around a central a transmitter so that each receives essentially the same direct signal but different echo signals. This allows summing and differencing of received signals to attenuate the direct signal and accentuate selected components of the echo signals. One convenient arrangement was to employ four receivers located on cardinal points of the compass around the transmitter, the transmitter pointing vertically and each receiver being pointed at an angle along its respective cardinal compass axis. This greatly simplified the computation of wind velocity and wind-shear.

However, from another aspect, the present invention is based upon the realization that the performance of the multi-receiver arrangements disclosed in our prior patent applications can be compromised by the effect of receiver and transmitter side-lobes, especially where the transmitter and receivers share a single dish. We have found that, even where a separate dish is used for each receiver, receiver and/or transmitter side-lobes can significantly compromise system performance. According to this aspect of the invention, multiple transmitters and receivers are arranged in pairs in each of which the respective transmitter and receiver point along essentially the same axis so that their primary antenna lobes coincide. Furthermore, it is preferable (but not essential) that four transmitter-receiver pairs are employed, each pair being located on a different cardinal compass axis with respect to each other, the axis of each pair being angled to the vertical along the respective compass axis, the axes of opposite transmitter-receiver pairs being oppositely inclined with respect to one another.

A fifth transmitter-receiver pair having a vertical axis may be employed to assist in gauging the vertical components of wind velocity and wind-shear (among other things). Conveniently, this fifth transmitter-receiver pair can be arranged at the centre of a circular array of the other four transmitter-receiver pairs.

It is highly desirable that the transmitter and receiver of each pair has its own separate reflector dish and that the two dishes of the pair are spaced some distance apart and are acoustically insulated—preferably by surrounding baffles—from one another to (i) create the desired main antenna lobe in conjunction with the acoustic transducer and (ii) effectively attenuate the direct signal transmission between the respective transmitter and receiver. This will also ensure that the direct signal from each of the other transmitters of the array is also significantly attenuated before detection by each receiver.

The transmitter-receiver pairs of the array may be activated individually and in turn, or altogether at once, or in combinations of two or more at the same time. While one-at-a-time operation has the advantage that no direct or echo signal generated by any other transmitter can be detected by the sole active receiver, it will increase the system cycle time by a factor of five. We have found that simultaneous activation of all transmitters and receivers is quite feasible provided adequate passive attenuation of direct signals, confinement of transmit and receive beams and spread of pointing angles are ensured. While wider pointing angle spread reduces the likelihood that echoes from one transmitter will be detected by receivers other than its pair, they also lead to loss of system accuracy because the receivers will be pointing to widely separated parts of the sky. It is thus preferable from the standpoint of system coherence to have the pointing angles of all transmitters and receivers tightly bunched—ie, lying within a cone of a few degrees—and to take whatever measures that are practical to reduce interference by direct signals and undesired echoes. The optimum cone angle will vary according to the range and purpose of the system, the cone angle generally varying inversely with range. Relatively large cone angles—say over 10 degrees—will generally be inappropriate for long range systems as the different receivers of an array might well interrogate portions of the sky hundreds of meters removed from one another.

As already noted, it is highly advantageous to employ separate transmitter-receiver pairs for each vector (including the vertical) in order to minimize the effect of transmit/receiver antenna sidelobes. These advantages are further enhanced by the use of narrow bandwidths to effectively assist in maintaining phase correlation of the received signal and the use of carefully optimized (reduced) sample numbers. These benefits are present whether linear FM chirps and Fourier matched filter techniques are employed or whether DM chirps and time-domain matched filter/correlation techniques are employed.

EXAMPLES OF THE INVENTION

Having portrayed the nature of the present invention, a particular example will now be described with reference to the accompanying drawings. However, those skilled in the art will appreciate that many variations and modifications can be made to the chosen example while conforming to the scope of the invention as defined in the following claims.

BRIEF SUMMARY OF THE DRAWINGS

In the accompanying drawings:

FIG. 1A is a diagrammatic plan view showing an array of five transmitter-receiver pairs that form the atmospheric acoustic sounder of the first example, FIG. 1B being a diagrammatic side elevation of the array taken through center line B-B of FIG. 1A. FIGS. 1A and 1B are not drawn to scale.

FIG. 2 is a block diagram of a time-domain matched filter signal processing system comprising the first example of a system suitable for use with the vertical transmitter-receiver pair of the array of FIGS. 1A and 1B and a linear FM chirp.

DESCRIPTION OF THE EXAMPLES

Figures 1A, 1B:
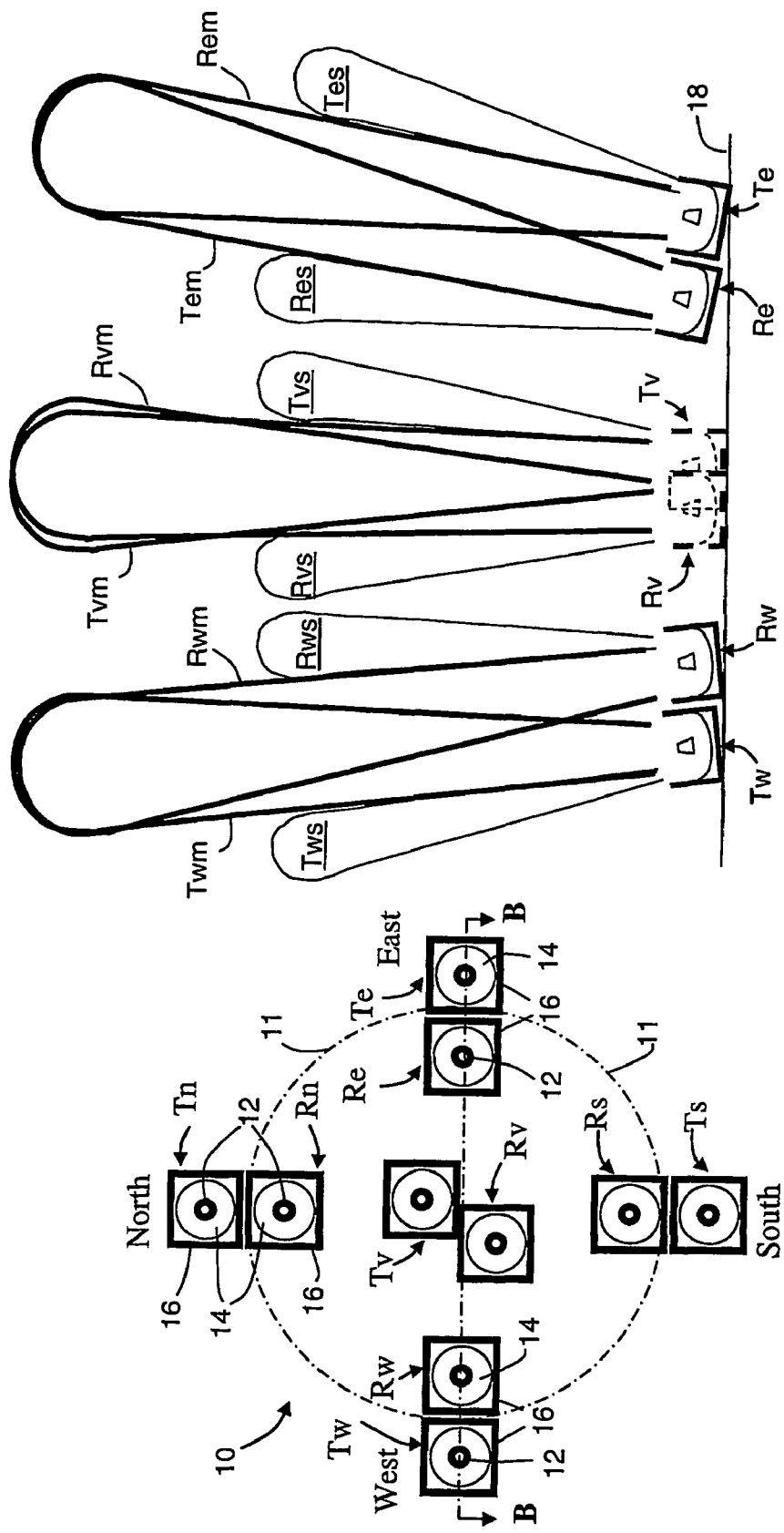

The transmitter-receiver array 10 of the chosen example is shown in diagrammatic plan and elevation views of FIGS. 1A and 1B, the vertical dimension of FIG. 1B being heavily compressed. Array 10 comprises five pairs of transmitter-receiver units arranged like a star with one pair at each cardinal point of the compass and one pair in the center. Since the peripheral pairs of units are evenly spaced, they can be considered to be located on a circle, indicated at 11. It will be appreciated that two, three, four or more transmitter-receiver pairs could be located on such a circle. The transmitter units are indicated by the letter T and the receiver units by the letter R, the subscripts n, s, e & w indicating the compass points at which the respective transmitters and receivers are located and the direction in which they are angled from the vertical. The subscript v indicates the central transmitter unit (Tv) and receiver unit (Rv) which point vertically upward.

Each transmitter and receiver unit in this example comprises a central transducer 12 arranged over an upwardly facing acoustic reflector dish 14 located within a high quality acoustic baffle 16 that is open only at the top. Baffles 16 serve to suppress antennae side lobes and to strongly attenuate the direct (horizontal and ground) signal between a transmitter unit and other receivers. Conveniently, each transmitter and receiver transducer 12 is formed by a paging horn unit that is capable of functioning as both a loudspeaker (transmitter transducer) and microphone (receiver transducer). Such paging horns normally have audio compression drivers and are available from Toa, Japan; for example models SC-610/SC, SC-615/SC and SC-630. As these horns come with their own reflector-horns, it is possible to use them instead of dishes 14. However, in this example, we need a strong, tightly focused, main or central antenna signal lobe so dishes 14 of about 1.8 m diameter are used in addition to the horns of the transducer units 12 and the aforementioned baffles 16.

FIG. 1B is a diagrammatic front elevation of array 10 of FIG. 1A taken on section B-B of FIG. 1A and indicates the principal antenna lobes of the east, vertical and west transmitter/receiver pairs, the main or central lobes being shown in bold lines relative to the associated antenna side lobes. The ground is indicated at 18. [Due to the limitations of sale the degree of overlap of the main-lobes cannot be properly depicted and only selected side-lobes can be shown.] The main-lobes of the east, vertical and west transmitters are indicated at Tem, Tvm and Twm while their respective side-lobes are indicated at Tes, Tvs and Tws. The main-lobes and side-lobes of the receivers are indicated in a corresponding fashion. [Note that vertical transmitter Tv and vertical receiver Rv are shown in broken lines as section line B-B in FIG. 1A does not actually pass through them.]

As array 10 is intended for short range atmospheric sounding over about 1 km near an airport, the n, s, e and w transmitter-receiver pairs are tilted radially outward with respect to circle 11 and toward their respective compass directions at about 8° to the vertical, a tilt somewhere between 5° and 10° being normal. By appropriate choice of transducers, reflector size, baffle quality and spacing between the transmitter and receiver of a unit, the included angle of the main lobe of each transmitter and receiver unit is about ±5°, though between ±3° and ±10° is normal with ±5° being preferred. This allows the main lobes lobe of the transmitter and receiver transmitter of a unit to be substantially coincident for at least 90% of the range without the side lobes of either unit intruding onto the main lobe of the other significantly. This has been found to significantly enhance the detectability and quality of the Doppler information in returned echoes. Direct signals transmitted via the transmitter side lobes or echo signals returned via the receiver side-lobes have been found to reduce the quality of the Doppler information.

This antenna array for a sodar system has been found to be superior in performance to an array comprising a single vertically pointing transmitter in the center of four angled receivers, particularly where the receiver transducers share a common reflector dish. However, the array 10 of the example requires more transmitter units and, therefore, greater attention to acoustically shielding the receivers from multiple direct signals, especially if all transmitters are operated simultaneously as is desirable to minimize cycle (up-date) time. In the array of this example, all transmitters operate simultaneously and send out identical chirps, and all the receivers are activated for the same listening period for each transmitted chirp.

Examples of signal processing systems for operating, for example, the vertical transmitter-receiver pair, Tv, Rv, of FIGS. 1A and 1B will now be described. The system of FIG. 2 employs a linear frequency modulated chirp as the chirp with time domain matched filtering, while the system of FIG. 5 employs a digitally modulated chirp and both time domain and frequency domain matched filtering. Though these systems will be described with respect to the vertical transmitter-receiver pair, it will be appreciated that the systems illustrated can be fully duplicated for each transmitter-receiver pair using a separate PC for each pair with a master PC to collate and display all outputs. The PC associated with each pair will normally be able to display the echoes detected by the respective receiver for checking performance.

The signal processing system of FIG. 2 is generally indicated at 30 and employs a time domain matched filter 32 to process received signals and present separate amplitude and phase components as sample streams on lines 34 and 36 for manipulation and display in graphical form on a PC 38. The vertical transmitter unit Tv (now indicated at 40) generates a linear frequency-modulated acoustic chirp 42 in the form of an audio tone that increases linearly from 1300 to 1600 Hz over a period of 37 s, representing a nominal bandwidth of 300 Hz or about 20% of the median carrier tone. A few Watts of audio power will generally be sufficient. Given that a range of one kilometer is of interest, a total listening time of 43 s will be required to ensure that there is time for a full 37 s echo to be returned from the height of 1 km; that is, a receiver will need to listen for the full 37 s of chirp transmission plus another 6 s for returning echoes.

Transmitter unit 40 is driven by an analog electrical signal on line 44 having the form indicated by graph 46 and being generated by a voltage-controlled oscillator 48 fed with a rising DC voltage, indicated by graph 50, on input line 51 derived from PC 38.

The vertical receiver unit Rv (now shown at 52) of the vertical transmitter-receiver pair detects faint echo signals, indicated by arrow 54, of chirp 42 returned from the atmosphere along with a large direct audio signal from transmitter 40 and extraneous environmental noise, which are together indicated by large arrow 56. The resultant combined electrical analog received signal of 43 s duration is output on line 58 and converted in pre-processor 59 into a complex digital signal (ie, with in-phase and quadrature components, I and Q) for input to matched filter 32. Analog received signal is first passed through A/D [analog-to-digital] converter 60, which digitizes input the received signal at 96 k/s for a period of 43 s commencing at the start of the transmission of chirp 42 as signaled on line 62. It is convenient to regard the digitized output on line 64 as being composed of N samples taken during the 37 s of chirp duration and M samples taken during the 6 s further listening time. Thus, in this example, there will be $3.552 \times 10^6$ N samples and $5.76 \times 10^5$ M samples generated from each chirp. This digital received signal is then manipulated in a digital signal processor that comprises the remainder of the circuit or system illustrated in FIG. 2.

Figure 3:
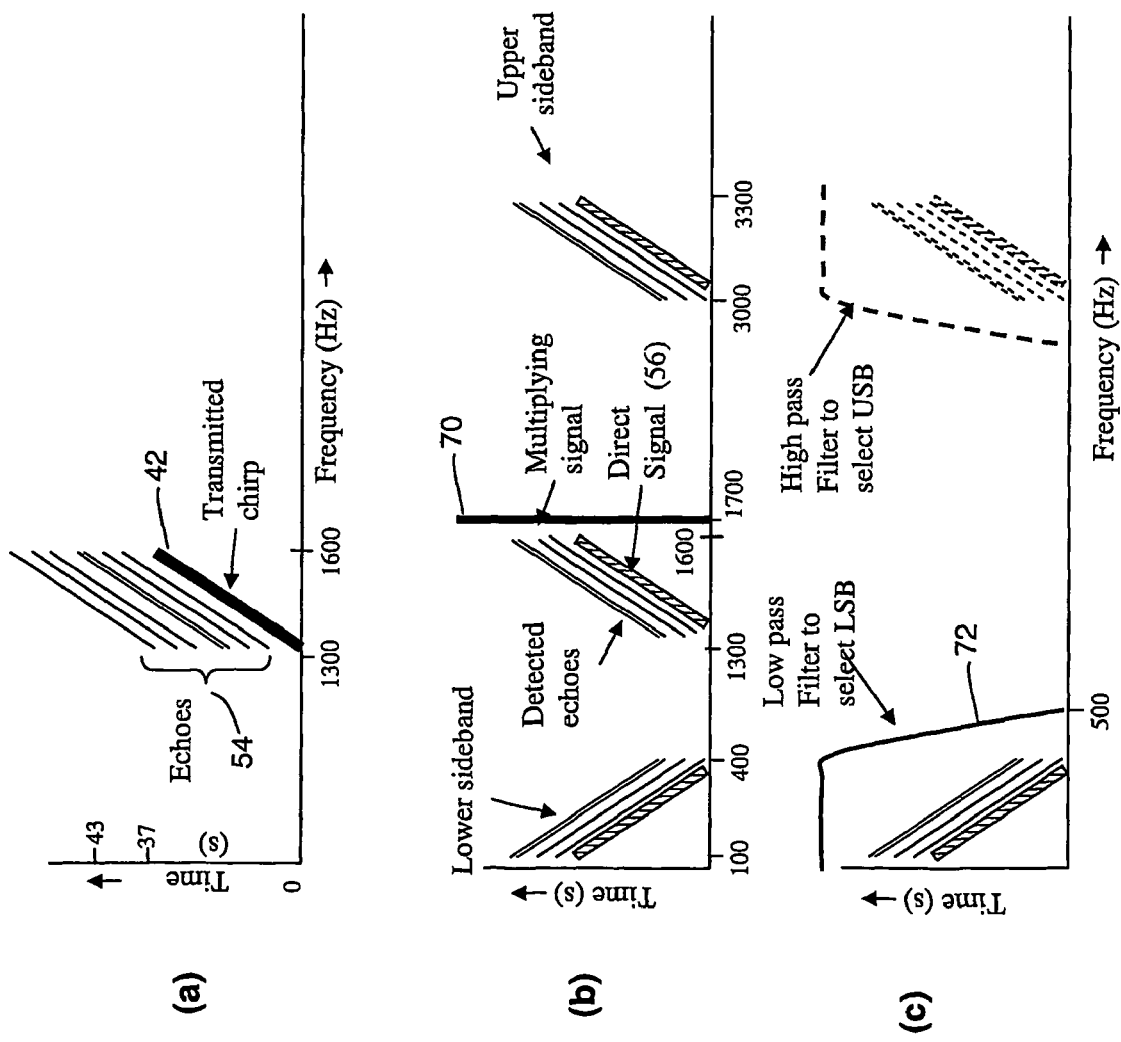
FIG. 3 is a series of three graphs (a), (b) and (c) that diagrammatically illustrate selected steps in the pre-processing of received signals before processing in a matched filter.

Reference should be made now to FIG. 3 as well as FIG. 2. As the N+M sample stream on line 64 needs to be converted to a complex format (ie, with real and imaginary components—conventionally indicated as I and Q) for use in matched filter 32, it is fed to a digital cosine multiplier 66 and a digital sine multiplier 68 and multiplied (mixed in analog terms), sample by corresponding sample, with digital cosine and sine versions of a 1700 Hz reference signal derived from reference oscillator 70 and A/D converter 71 (operating at 96 kHz synchronously with A/D converter 58). As each multiplier generates upper and lower sideband components and only the latter are required, outputs of multipliers 66 and 68 are low-pass filtered by filters 72 and 74 to generate the I and Q output streams, each of N+M samples, on lines 76 and 78 that feed a correlator process 80 in matched filter 32. In effect, the frequency range of the detected received signals is down-converted from 1300-1600 Hz and flipped to the 400-100 Hz range in digital format and into separate in-phase and quadrature components.

The operation of mixer/multiplier 66 or 68 is illustrated by the graphs of FIG. 3, the axes of which are not to scale. The graph of FIG. 3 (a) plots the frequency of the transmitted chirp 42 and returned echoes 54 with respect to time. It will be seen that, while echoes continue to be received after the end of the 43 s listening time, they will be truncated. [For simplicity such truncated echoes are not shown in graphs (b) and (c) of FIG. 3; they will and will largely be rejected by the correlation process, anyhow.] The central graph of FIG. 3 (b) shows the detected signals on line 64 (including direct signal 56) and the 1700 Hz reference signal from oscillator 70, the effect of multiplier 66 or 68 being to create upper and lower sidebands as indicated. Graph 3(c) indicates graphically the effect of low pass filter 72, which rejects all signals above 500 Hz, including the upper sideband (now shown in broken lines).

In effect, matched filter 32 performs a correlation between two sets of complex signals, one of N+M values derived from the received signal via pre-processor 59 via inputs 76 and 78 as described above and the other of N values on inputs 82 and 84 derived from the electrical chirp signal on line 44. In fact, however, inputs 82 and 84 in this case are identical and are shown on two lines to emphasize there pairing with I and Q inputs 76 and 78. Inputs 82 and 84 are derived as follows: chirp signal on line 44 is passed via line 86 through an A/D converter 88 then mixed in multiplier 90 with a 1700 Hz signal input on line 92 and the lower sideband of the product is selected by low pass filter 94 and output as the two identical inputs 82 and 84. Each of these has N values between 400 to 100 Hz, mixer 90 having flipped the signal in the same way as mixers 66 and 68.

Figure 9:
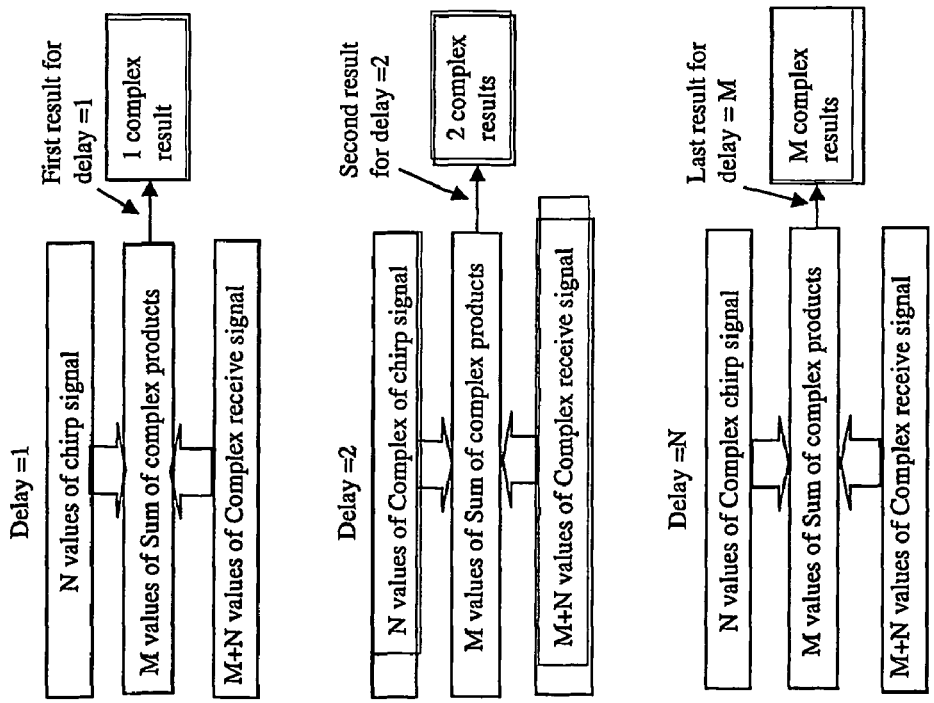
FIG. 9 is a diagram illustrating the operation of the time domain matched filtering correlator of the system of FIGS. 2 and 4.

In the following description of the operation of the correlation function of time domain matched filter 32, reference should be made to FIG. 9 as well as FIG. 2. This function is undertaken by correlator 96, which performs M×N complex multiplies and sums on each of the 400-100 Hz N+M values on I and Q inputs on lines 76 and 78 with N values of the 400-100 Hz chirp-reference signal on respective input lines 82 and 84 at each of N delays or time-shifts. The N delays or time-shifts are generated by process 98 of time-domain matched filter 32.

The time-domain matched filter 32 yields M amplitude and phase output values on lines 34 and 36 from which various atmospheric parameters can be derived. These have been found to be subtly different from those generated by frequency domain processing (as illustrated in the examples of some of our prior patent applications) and are to be preferred in particular circumstances. Since the phase component of a given sample will indicate the incremental phase shift from the preceding sample, it will be usual to subject the phase sample stream to an 'unwrap function' performed by PC 38 so as to generate a cumulative phase output that is indicative of relative vertical wind speed at a given altitude. This relative wind speed can be rendered absolute by offsetting the known near-ground wind speed against the indicated relative speed at that near-ground height. Further manipulation of the phase and amplitude outputs by PC 38 can yield graphical representations of wind velocity, temperature, humidity and other important atmospheric parameters with altitude, as taught by our prior patent applications.

Figure 4:
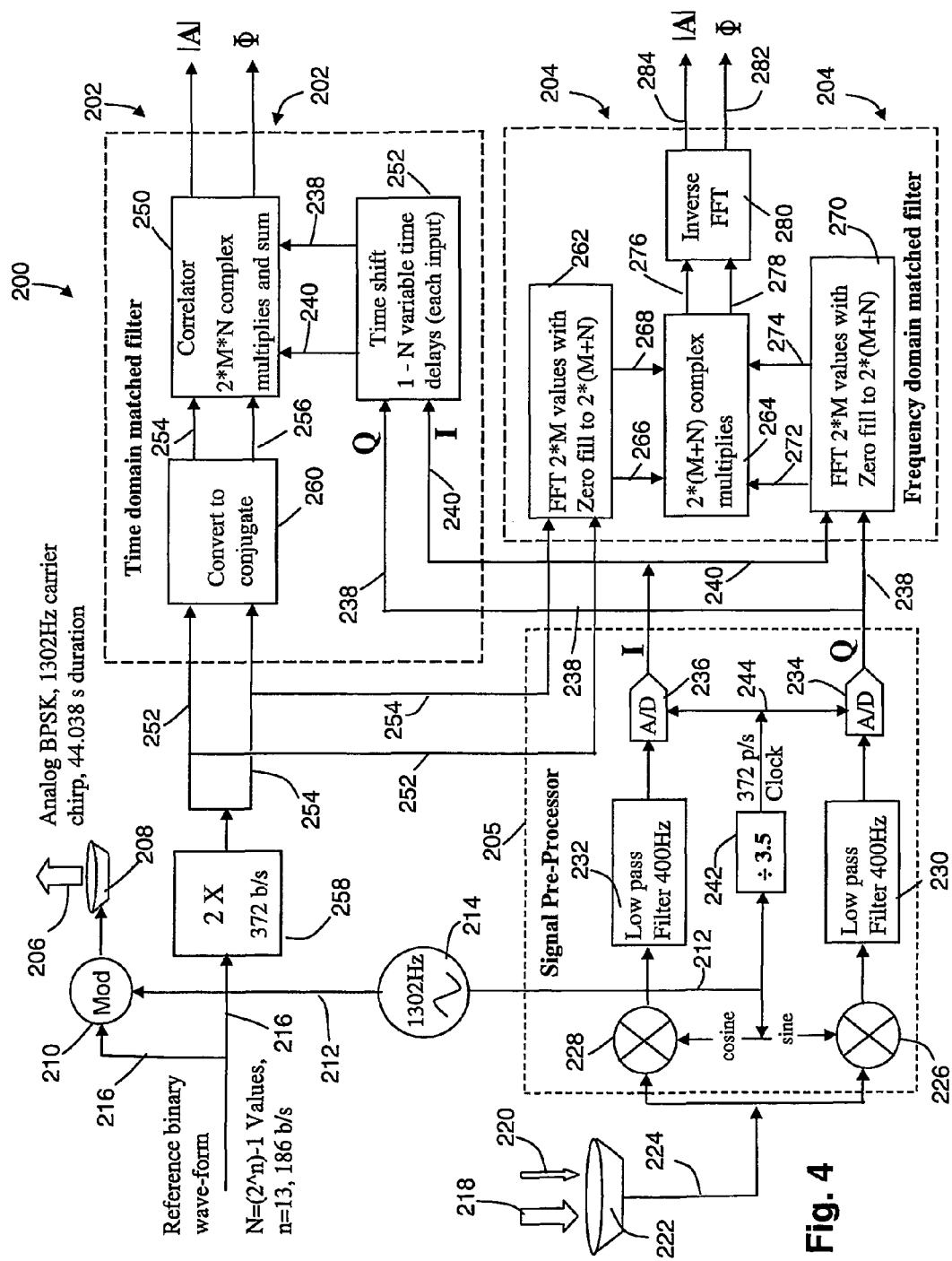
FIG. 4 is a block diagram illustrating a second example of a signal processing system using a digitally encoded chirp and employing both a time domain matched filter and a Fourier domain matched filter suitable for use with the vertical transmitter-receiver pair of the array of FIGS. 1A and 1B.

FIG. 4 diagrammatically illustrates the system 200 of the second example where an encoded DM chirp is used instead of an FM chirp. The signal processor means of this example employs both a frequency-domain matched filter 202 and time-domain matched filter 204 (to provide complementary, or alternative, modes of signal processing) as well as a received signal pre-processor 205. As mentioned above, we have found considerable advantage in comparing the outputs of both types of matched filter as they yield different results in different atmospheric conditions.

Figure 7:
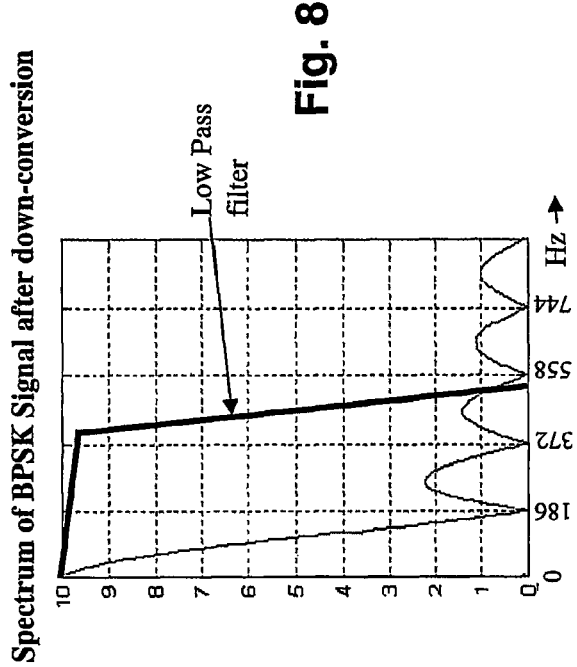
FIG. 7 is a graph illustrating the frequency spectrum of the DM chirp of FIG. 6.
Figure 8:
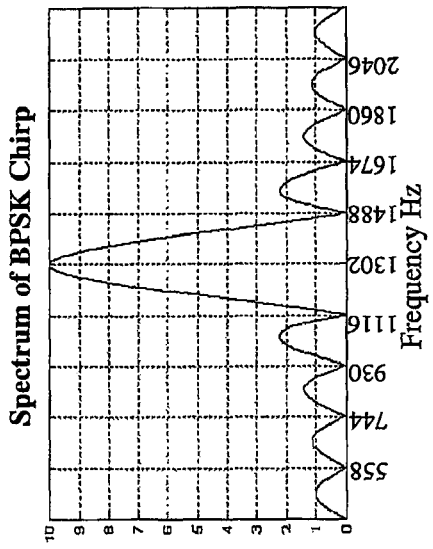
FIG. 8 is a graph similar to that of FIG. 7 showing the DM chirp after down-conversion, the effect of lowpass filtering also being shown.
Figure 5:
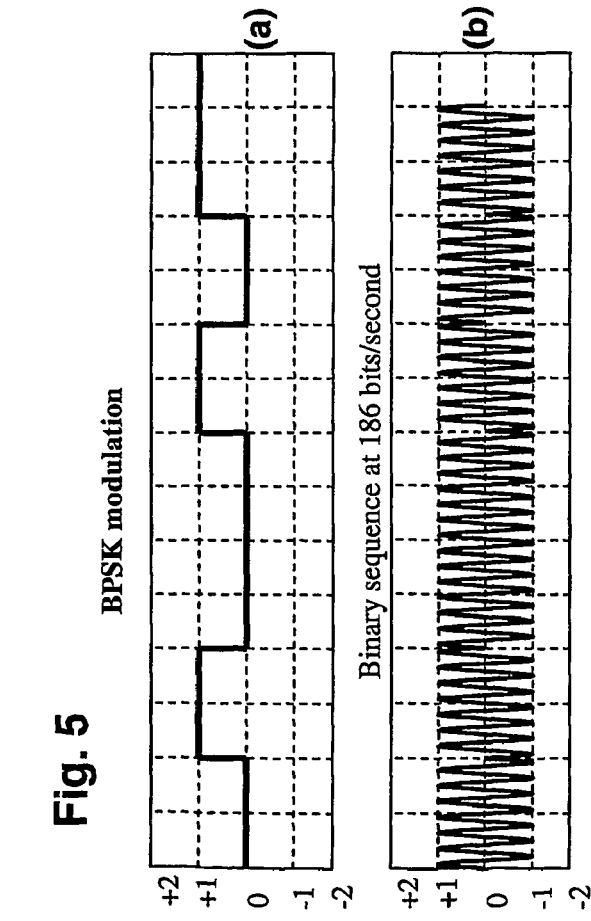
FIG. 5 is two graphs (a) and (b) illustrating binary phase-shift keyed [BPSK] modulation, graph (a) showing the portion of the binary digital signal and graph (b) showing the corresponding portion of the analog transmitted DM chirp signal.
Figure 6:
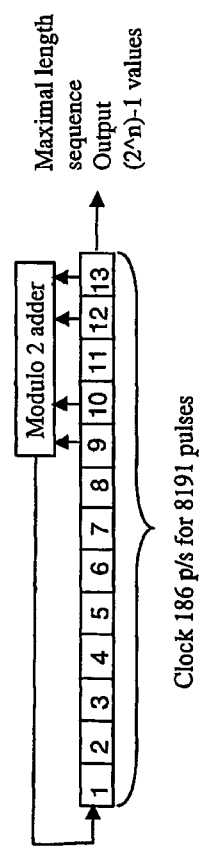
FIG. 6 is a diagram illustrating one way of generating a BPSK pulse compression code of the maximal length for use in generating a DM chirp exhibiting pulse-compression characteristics.

In this example, the chirp 206 transmitted by vertical transmitter unit Tv (indicated as 208 in FIG. 4) is a digitally modulate BPSK (binary phase shift keyed) carrier tone of 1302 Hz and, taking the optimum nominal bandwidth to be 20% of this, suggests a bandwidth of 260 Hz. However, a DM signal of 260 Hz bandwidth at it's −6 dB points requires an overall or operational bandwidth at the first null points of the spectrum of 260/0.7=371 Hz. A bandwidth of 372 Hz (±186 Hz) is produced by a modulating digital signal with a bit rate of 372/2=186/s. Using BPSK, the phase of the 1302 Hz carrier is changed according to the binary data every 7 cycles, as shown in FIG. 5. This provides a digitally modulated signal that conforms to the bandwidth indicated above. By using a maximal length sequence that it easily generated using a linear feedback shift register as shown in FIG. 6, a digital code is generated that has very good correlation characteristics. By using a shift register with 13 stages (FIG. 6), a maximal length sequence of $N=(2^{13})-1=8191$ bits is generated and can be used to modulate the 1302 Hz carrier using a simple balanced modulator to provide a transmit time of 8191/186=44.038 seconds. For a range of 1 km the total receiver listening time is 44.038+2*(1000/333)=50 seconds. The frequency spectrum of the BPSK DM chirp is shown by the graph of FIG. 7, with the effect of low-pass filtering being shown in FIG. 8.

Returning to FIG. 4, the above-mentioned balanced modulator is indicated at 210, the 1302 Hz carrier is input to modulator 210 on line 212 and derived from an oscillator 214, while the binary reference waveform is input to modulator 210 on line 216. The direct and echo signals 218 and 220 are detected and conditioned by vertical receiver unit Rv (here indicated at 222) and, in this example, fed on line 224 to pre-processor 205 which operates largely as an analog device. Input signal on line 224 is fed to analog sine and cosine multipliers 226 and 228 which also receive the 1302 Hz carrier from oscillator 214 via line 212. Outputs of multipliers 226 and 228 are low-pass filtered in 440 Hz analog filters 230 and 232 and then through A/D converters 234 and 236 to generate the digital Q and I bit streams for input into time domain matched filter 202 and frequency domain matched filter 204 on lines 238 and 240. It is to be noted that multipliers 226 and 228 and filters 230 and 232 effect a down-conversion of the received signal on line 224 to 0-186 Hz at the first null (see FIG. 8), the filters removing any additional noise and carrier products. This stage is shown in analog but can also be done digitally, but the sampling rate would be higher because of the higher carrier frequency. The low pass signals from the filters can now be sampled at 372 samples per second by clocking A/D converters 234 and 236 at that rate, the clocking signal being derived from a 1/3.5 divider 242, which is fed from line 212 and outputs the 372 p/s sampling clock rate on line 244.

The digital I and Q sample stream values are fed to correlator process 250 in time domain matched filter 202 via time shift (variable delay) process 252 for correlation with two identical images of the transmitted signal on inputs 254 and 256 that serve as I and Q images of the chirp. Inputs 254 and 256 are derived in as follows: the bit rate (186/s) of reference binary waveform on line 216 is doubled to 372 b/s to match the bit rate of A/D converters 234 and 236 in signal pre-processor 205, both counting forwards, from 0 to 372. This direction must be reversed (to count from 372 to 0) to match the I and Q inputs on lines 238 and 240 (which were reversed as a result of the actions of multipliers 226 and 228 and their respective low pass filters 230 and 232. Accordingly inputs 252 and 254 are fed to a converter 260 that achieves this end, and the outputs of which form the inputs 254 and 256 to correlator 250.

Correlator 250 than operates in essentially the same manner as correlator 96 of the system of FIG. 2. Thus, the I and Q components of the complex received signal image on inputs 238 and 240 are each successively time shifted or delayed 1−N times in process 252 so that correlator 250 (like correlator 96 of the first example) works by a shift-multiply-add process (see FIG. 9), which is carried out 2*M*N times. In this example, N=8191+1 bit of 0 padding. The value for M is set by the extra listening time required for a 1 km range, which is 6 seconds so that M is 6*186=1116 samples. The total number of operations for the correlator is now $2*8192*1116=18.285\times10^6$, a tolerable number of correlations to be performed by a modern PC to generate near real-time results.

As the received signal has been effectively down-sampled, the time domain matched filter runs very quickly because of the small number of samples. This sample rate is adequate for normal wind ranges but, for high wind speeds it may be necessary to increase the sample rate to ensure that peak wind speeds do not result in phase shifts in excess of 2pi during a sample interval. Increasing the sample rate will, however, result in increased processing times.

Figure 10:
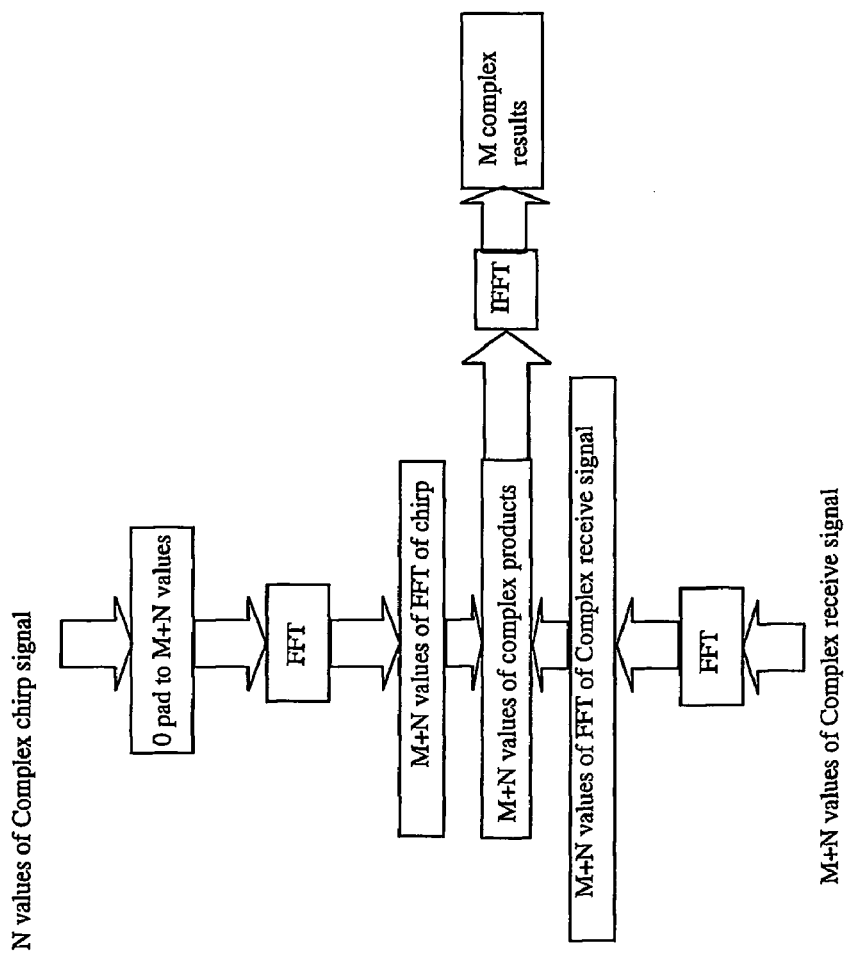
FIG. 10 is a diagram illustrating the operation of the Fourier domain matched filtering of the system of FIG. 4.

Turning to the operation of the frequency domain processing in matched filter 204, reference should be made to FIG. 10 as well as to FIG. 4. The 'forward counting' 372 b/s image of reference binary waveform on lines 252 and 254 are formed by process 257 and fed to a fast Fourier transform (FFT) process 262 for complex multiplication in multiplier 264 in the Fourier (frequency) domain with the I and Q received sample streams input on lines 238 and 240. However, since these received sample streams are N+M samples in length, it is first necessary to zero fill M samples of the input transmitted signal streams on inputs 258 and 260 to give the outputs 266 and 268 of FFT 262 the same sample number (N+M) as the received (I and Q) samples. The latter sample streams on lines 238 and 240 are subjected to Fourier transformation in FFT process 270 in frequency domain matched filter 204 and the output transformed sample streams are fed on lines 272 and 274 to complex Fourier domain multiplier 264 from which the 'real' and 'imaginary' frequency domain products are output on lines 276 and 278 for inverse fast Fourier transformation by process 280 for re-conversion to the time domain as amplitude and phase outputs on lines 282 and 284.

Since transmitter 208 and receiver 222 are the central ones (Tv and Rv) of FIGS. 1A and 1B, the amplitude output 282 will be indicative of the variation of reflective anomalies with respect to altitude while the phase output 284 will be indicative of Doppler components (ie, vertical wind speed) with respect to altitude, provided the phase output is 'unwrapped' using an unwrap function such as that available in Matlab.

Figure 11:
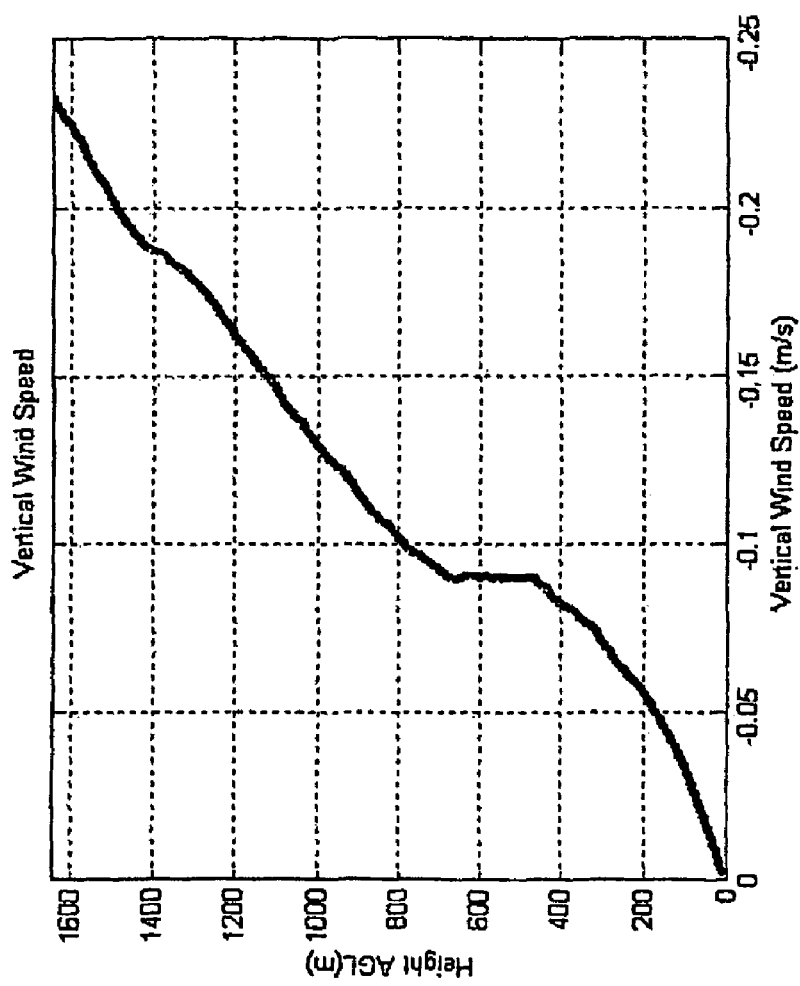
FIG. 11 is a graph of the variation of vertical wind speed with altitude obtained from the system of FIG. 4 using the time domain matched filter output.

Note that sample number is equated with altitude. The resultant vertical wind speed is portrayed in FIG. 11.

Where the full array of receiver units of FIGS. 1A and 1B are employed the phase and amplitude outputs of opposite receiver units can be differenced to indicate horizontal wind speed in the direction of the opposing units. Techniques for doing so were disclosed in our prior patent applications.

While a number of examples have been described that exhibit the advantages of the present invention, it will be appreciated that many other examples can be devised and many modifications to these examples can be made without departing from the scope of the present invention as defined by the following claims.

For example, a digital front end could be used in the second example or an analog front end could be used in the first example. If the signal processing burden is regarded as excessive for the purpose, it is possible to down sample in the chirp receiver if an analog front end is used, or to down sample the digital signal in an all digital system by, say, taking only every 4 sample value and reducing the effective sample rate from 96000 to 24000/second. Again, this economy will not be desirable where high wind speeds are involved, such as in the case of aircraft wake vortex monitoring where aliasing of the phase and errors in the wind speed are likely.

The invention claimed is:

1. A monostatic sodar system for generating information about atmospheric parameters over an altitude range, comprising:
   at least three peripheral transmitter-receiver pairs arranged substantially equidistant on a circle, wherein the transmitter and receiver of each of said peripheral pairs are tilted radially outward with respect to the circle at an angle to the vertical;
   wherein each transmitter and receiver comprises an acoustic transducer, and acoustic reflector and a surrounding baffle such that acoustic echoes returned from the atmosphere resulting from acoustic transmissions of one transmitter are preferentially received by the receiver of the respective transmitter-receiver pair relative to all other receivers; and
   signal processing means connected to each transmitter-receiver pair and adapted to:
      cause at least one transmitter of a transmitter-receiver pair to transmit an encoded acoustic chirp of at least 100 ms duration into the atmosphere,
      process signals received by the receive of the respective pair during the transmission of said chirp and for a time interval thereafter so as to derive information indicative of said atmospheric parameters with respect to altitude.

2. A sodar system according to claim 1 wherein said angle to the vertical is less than 10 degrees.

3. A sodar system according to claim 1 wherein:
   a central transmitter-receiver pair is arranged near the center of the circle,
   the transmitter and receiver of said central pair are directed substantially vertical, and
   the transmitter and receiver of said central pair each comprises an acoustic transducer, and acoustic reflector and a surrounding baffle such that acoustic echoes returned from the atmosphere resulting from acoustic transmissions of the central transmitter of the central pair are preferentially received by the receiver of the central pair relative to all other receivers.

4. A sodar system according to claim 1 wherein:
   said signal processor means is operable to cause a plurality of transmitters to transmit at the same time and to process signals received by the receivers of the respective transmitter-receiver pairs at the same time.

5. A sodar system according to claim 1 wherein:
   with respect to each transmitter-receiver pair, the transmitter has a dominant central transmit antenna lobe and the receiver has a dominant central receive antenna lobe, and
   said transmitter lobe and said receiver lobe overlap one another for substantially the entire range.

6. A sodar system according to claim 5 wherein:
   each said antenna lobe spreads outward and upward so that it subtends an included angle at near the respective receiver or transmitter of not more than 10 degrees.

7. A sodar system according to claim 1 wherein:
   said acoustic chirp is encoded by frequency modulation such that the frequency of the chirp varies linearly with time.

8. A sodar system according to claim 1 wherein:
   said chirp is encoded by digital modulation.

9. A sodar system according to claim 8 wherein:
   said chip is encoded by binary phase shift keying.

10. A sodar system according to claim 1 wherein:
    said chirp is at least 10 seconds in duration.

11. A sodar system according to claim 1 wherein:
    said chirp has a ratio of bandwidth to center frequency of less than 0.35.

12. A sodar system according to claim 1 wherein:
    said chirp has a ration of bandwidth to center frequency of between 0.4 and 0.2.

13. A sodar system according to claim 1 wherein:
    said chirp has a bandwidth of less than 500 Hz.

14. A sodar system according to claim 1 wherein:
    said signal processing means includes a matched filter adapted to process the received signal by reference to the encoding of the chirp.

15. A sodar system according claim 1 wherein:
    said signal processing means is adapted to:
       process the chirp transmitted by the transmitter of one of said transmitter-receiver pairs to generate a transmitted signal image,
       process the signals received by the receiver of said one of said transmitter-receiver pairs to generate a received signal image, and
       correlate said transmitted signal image and said received signal image so as to derive said information.

16. A sodar system according to claim 15 wherein:
    said transmitted signal image is a stream of digital samples generated by converting said chirp into digital format,
    said signal processor means is adapted to:
       convert the received signal image into complex form, thereby creating separate in-phase and quadrature streams of digital samples as a converted received signal image,
       perform a shift-multiply-sum correlation in the time domain between said transmitted signal image and said converted received signal image to thereby generate a first output containing information relating to variation of the amplitude of said acoustic echoes with altitude and a second output containing information relating to variation of one of phase and Doppler components of said acoustic echoes with altitude.

17. A sodar system according to claim 15 wherein:
    said transmitted signal image is a stream of digital samples generated by converting said chirp into digital format,
    said received signal image is a stream of digital samples generated by converting said received signal into digital format, said signal processor means is adapted to:
- perform a Fourier transformation on said transmitted signal image to convert it into the frequency domain as a converted transmitted signal image,
- convert the received signal image into complex form, thereby creating separate in-phase and quadrature streams of digital samples as a converted received signal image,
- perform a Fourier transformation on said converted received signal image,
- correlate in the frequency domain to generate a frequency domain correlation,
- perform an inverse Fourier transform on said frequency domain correlation to convert it to the time domain, to thereby generate a first output containing information relating to variation of the amplitude of said acoustic echoes with altitude and a second output containing information relating to variation of one of phase and Doppler components of said acoustic echoes with altitude.

18. A sodar system according to claim 16 wherein:
said transmitted signal image comprises N samples corresponding to the duration of the chirp,
said received signal image comprises N samples corresponding to the duration of the chirp and an additional M samples corresponding to said time interval, and
said first and second outputs are of M samples.

19. Apparatus for generating information about atmospheric parameters over an altitude range, comprising:
- a plurality of transmitter-receiver pairs which are adapted to be arranged substantially equidistant on a circle and supported from the ground, wherein the transmitter and receiver of each of said peripheral pairs are tilted radially outward with respect to the circle at an angle to the vertical of less than 10 degrees to the vertical,
- a central transmitter-receiver pair which is arranged near the center of the circle, and
- wherein each transmitter and receiver comprises an acoustic transducer, and acoustic reflector and a surrounding baffle such that acoustic echoes returned from the atmosphere resulting from acoustic transmissions of one transmitter are preferentially received by the receiver of the respective transmitter-receiver pair relative to all other receivers.

* * * * *